US007680625B2

(12) United States Patent
Trowbridge, Jr. et al.

(10) Patent No.: US 7,680,625 B2
(45) Date of Patent: Mar. 16, 2010

(54) SYSTEMS AND METHODS FOR MONITORING SYSTEM PERFORMANCE

(75) Inventors: Jack I. Trowbridge, Jr., Bend, OR (US);
Ricky L. Wright, Prineville, OR (US);
Delano S. Richie, Montgomery, TX (US); David D Barton, Houston, TX (US)

(73) Assignees: MacSema, Inc., Bend, OR (US); EPI, L.P., Houston, TX (US)

( * ) Notice: Subject to any disclaimer, the term of this patent is extended or adjusted under 35 U.S.C. 154(b) by 655 days.

(21) Appl. No.: 11/600,298

(22) Filed: Nov. 14, 2006

(65) Prior Publication Data

US 2009/0139336 A1  Jun. 4, 2009

Related U.S. Application Data

(60) Provisional application No. 60/736,788, filed on Nov. 14, 2005, provisional application No. 60/789,854, filed on Apr. 5, 2006.

(51) Int. Cl.
*G01N 29/04* (2006.01)

(52) U.S. Cl. .................. 702/182; 702/150; 73/592; 73/866.5; 73/623; 73/622; 340/605; 340/683

(58) Field of Classification Search ................ 702/150, 702/113, 56, 54, 182, 51; 73/49.1, 592, 622, 73/542, 4.5 R, 40, 152.58, 866.5, 809, 587, 73/623; 340/605, 689, 683, 681, 603, 606, 340/539

See application file for complete search history.

(56) References Cited

U.S. PATENT DOCUMENTS

| 3,958,451 | A | * | 5/1976 | Richardson | ................ 73/644 |
| 3,996,735 | A | | 12/1976 | Zurcher | |
| 4,578,573 | A | | 3/1986 | Flies et al. | |
| 4,721,849 | A | | 1/1988 | Davis et al. | |
| D296,330 | S | | 6/1988 | Davis et al. | |
| 4,752,911 | A | | 6/1988 | Prevost et al. | |
| 4,860,228 | A | | 8/1989 | Carroll | |
| 4,868,409 | A | | 9/1989 | Tanaka et al. | |
| 4,935,195 | A | * | 6/1990 | Palusamy et al. | ........... 376/249 |
| 4,965,828 | A | | 10/1990 | Ergott, Jr. et al. | |
| 4,982,371 | A | | 1/1991 | Bolan et al. | |

(Continued)

FOREIGN PATENT DOCUMENTS

JP    62083608 A  *  4/1987

OTHER PUBLICATIONS

International Search Report and Written Opinion, PCT Application No. PCT/US2006/044267, Apr. 9, 2008, 9 pages.

(Continued)

*Primary Examiner*—Carol S Tsai
(74) *Attorney, Agent, or Firm*—Kolisch Hartwell, P.C.

(57) ABSTRACT

The present disclosure includes systems, apparatus, and methods for monitoring a pipeline network having plural inspection sites. The system comprises a memory module associated with one or more inspection sites, with each memory module storing one or more performance parameters corresponding to the associated inspection site. The system also comprises a measuring device operable to collect performance data of each associated inspection site. The system further comprises a portable reader configured to read the memory module, and in association with the measuring device, to compare the one or more performance parameters with the performance data to validate the performance data while in proximity to the associated inspection site.

23 Claims, 3 Drawing Sheets

U.S. PATENT DOCUMENTS

| | | | |
|---|---|---|---|
| 4,999,742 A | 3/1991 | Stampfli | |
| 5,001,670 A | 3/1991 | Slate et al. | |
| 5,058,074 A | 10/1991 | Sakamoto | |
| 5,070,500 A | 12/1991 | Horinouchi et al. | |
| 5,091,771 A | 2/1992 | Bolan et al. | |
| 5,163,025 A | 11/1992 | Chamberlain | |
| 5,173,876 A | 12/1992 | Kawashima et al. | |
| 5,191,554 A | 3/1993 | Lee | |
| 5,196,374 A | 3/1993 | Hundt et al. | |
| 5,197,026 A | 3/1993 | Butler | |
| 5,206,818 A * | 4/1993 | Speranza | 702/24 |
| 5,206,938 A | 4/1993 | Fujioka | |
| 5,351,718 A | 10/1994 | Barton | |
| 5,506,757 A | 4/1996 | Brorby | |
| 5,539,252 A | 7/1996 | Brorby | |
| 5,576,936 A | 11/1996 | Brorby | |
| 5,615,247 A | 3/1997 | Mills | |
| 5,858,500 A | 1/1999 | MacPherson | |
| 5,939,954 A | 8/1999 | Kim et al. | |
| 5,939,984 A | 8/1999 | Brady et al. | |
| 6,023,986 A * | 2/2000 | Smith et al. | 73/866.5 |
| 6,046,676 A | 4/2000 | Ward et al. | |
| 6,147,604 A | 11/2000 | Wiklof et al. | |
| 6,166,914 A | 12/2000 | Sugiyama et al. | |
| 6,189,384 B1 * | 2/2001 | Piety et al. | 73/592 |
| 6,220,098 B1 * | 4/2001 | Johnson et al. | 73/592 |
| 6,243,657 B1 * | 6/2001 | Tuck et al. | 702/150 |
| 6,265,973 B1 | 7/2001 | Brammell et al. | |
| 6,356,197 B1 | 3/2002 | Patterson et al. | |
| 6,499,349 B1 | 12/2002 | Aronsson | |
| 6,567,006 B1 * | 5/2003 | Lander et al. | 340/605 |
| 6,813,949 B2 * | 11/2004 | Masaniello et al. | 73/623 |
| 6,859,757 B2 | 2/2005 | Muehl et al. | |
| 6,957,157 B2 * | 10/2005 | Lander | 702/56 |
| 7,009,517 B2 | 3/2006 | Wood | |
| 7,027,955 B2 | 4/2006 | Markwitz et al. | |
| 7,032,814 B2 | 4/2006 | Blankenship | |
| 7,076,532 B2 | 7/2006 | Craik | |
| 7,106,198 B2 | 9/2006 | Phipps et al. | |
| 7,266,992 B2 * | 9/2007 | Shamout et al. | 73/40.5 A |
| 7,383,318 B2 | 6/2008 | Craik | |
| 7,523,667 B2 * | 4/2009 | Brown et al. | 73/592 |
| 7,526,944 B2 * | 5/2009 | Sabata et al. | 73/49.1 |
| 2002/0180588 A1 | 12/2002 | Erickson et al. | |
| 2002/0186134 A1 | 12/2002 | Rehfus et al. | |
| 2004/0066296 A1 | 4/2004 | Atherton | |
| 2004/0135668 A1 | 7/2004 | Hoffer et al. | |
| 2005/0225427 A1 | 10/2005 | Bell et al. | |
| 2005/0269394 A1 | 12/2005 | Ozer | |
| 2005/0279169 A1 * | 12/2005 | Lander | 73/592 |
| 2006/0009856 A1 | 1/2006 | Sherman et al. | |
| 2006/0074570 A1 * | 4/2006 | Belke et al. | 702/50 |
| 2006/0097847 A1 | 5/2006 | Bervoets | |
| 2006/0113371 A1 | 6/2006 | Robson et al. | |
| 2006/0133609 A1 | 6/2006 | Rodriguez et al. | |
| 2006/0136177 A1 * | 6/2006 | Patanian | 702/187 |
| 2006/0145876 A1 | 7/2006 | Kimura et al. | |
| 2006/0208089 A1 | 9/2006 | Sadler et al. | |
| 2006/0208853 A1 | 9/2006 | Kung et al. | |
| 2006/0288756 A1 * | 12/2006 | De Meurechy | 73/1.01 |

OTHER PUBLICATIONS

MacSema, Inc., "What is a Contact Memory Button", Sep. 8, 2002, 2 pages.

MacSema, Inc., "ButtonReader", Sep. 8, 2002, 1 page.

MacSema, Inc., "MiniButton", Feb. 4, 2003, 1 page.

Thermo Fisher Scientific Inc., "Safeguarding Test Data Integrity With the Electronic Position Indicator", 2008, 3 pages.

MacSema, Inc., "Handheld-Analyzer Application—Handheld User's Guide", *MacSema_Niton_User's_Guide_v102 [1]*, 2008, 17 pages.

International Atomic Energy Agency, "Development of Protocols for Corrosion and Deposits Evaluation in Pipes by Radiography", IAEA-TECDOC-1445, Apr. 2005, pp. 1-107.

The American Society for Nondestructive Testing, "Introduction to Nondestructive Testing", www.asnt.org/ndt/primer1.htm, 2005, 21 pages.

R/D Tech, "Tube and Pipe Weld Inspection Using OmniScan™ PA", www.rd_tech.com, rev. Jul. 2004, 2 pages.

* cited by examiner

- 200 SELECT PLURAL INSPECTION SITES IN A PIPELINE NETWORK
- 210 ASSOCIATE WITH ONE OR MORE INSPECTION SITES A SITE IDENTIFER (MEMORY MODULE) STORING SITE LOCATION DATA OF A CORRESPONDING INSPECTION SITE
- 220 STORE SITE LOCATION DATA CORRESPONDING TO PLURAL INSPECTION SITES ON A PORTABLE READER
- 230 TRANSMIT PRESENT SITE LOCATION DATA FROM THE SITE IDENTIFIER (MEMORY MODULE) AT A PRESENT INSPECTION SITE TO THE PORTABLE READER
- 240 COMPARE PRESENT SITE LOCATION DATA WITH REFERENCE SITE LOCATION DATE TO DETERMINE A LOCATION OF A DESTINATION INSPECTION SITE

Fig. 3

SYSTEMS AND METHODS FOR MONITORING SYSTEM PERFORMANCE

RELATED APPLICATIONS

The present application claims the benefit of U.S. Provisional Application Ser. No. 60/736,788, filed Nov. 14, 2005, and entitled "System Integrity Monitoring Device and Process"; and U.S. Provisional Application Ser. No. 60/789,854, filed Apr. 5, 2006, and entitled "System Integrity Monitoring Device and Process"; all of which are incorporated herein by reference in their entirety for all purposes.

TECHNICAL FIELD

The present disclosure relates generally to systems and methods for monitoring system performance, and more specifically to systems and methods for monitoring the performance of a pipeline network having plural inspection sites.

BACKGROUND OF THE DISCLOSURE

Generally, piping is used in the nuclear, petrochemical, and other industries for transporting fluids. A large amount of piping may be set up around a facility in an intricate, non-linear fashion. The transported fluids in the piping may be under high pressures, poisonous, and/or combustible. These factors and others may cause the pipes to degrade over time by corrosion, erosion, depositing, and blockage. This degradation may result in leakages, explosions, or other undesirable results. Leaks or fugitive emissions may also occur along a pipeline at flanges, joints, valves, vessels, etc. Moreover, keeping track of materials, such as valves, flanges, vessels, motors, etc., around a facility is important.

Monitoring the performance of the pipes is essential. For example, monitoring for the integrity of a pipe and/or for fugitive emissions is essential. Reliable and swift monitoring may signal when a pipe, flange, etc. requires replacement or repair. One integrity parameter to monitor is the wall thickness of the pipes. Common methods used to measure and monitor wall thickness include ultrasonic, visual, mechanical, optical, electromagnetic, electronic, thermal, chemical, and analytical inspection as well as infrared thermography, magnetic flux leakage (MFL), radioisotope gamma radiometry, and radiography.

Regardless of the method used, problems exist. For example, a user may have to return to a control room before analyzing retrieved data. A user may have to return to a control room to compare a current performance reading obtained at an inspection point to a last performance reading recorded at that inspection point. Accordingly, a user would not know while onsite or in real time whether any problems exist regarding a pipe or a particular reading. Further, a user may take measurements along a pipe in the wrong order, resulting in confusion, wasted time, higher operating costs, and recording errors.

The present disclosure may utilize memory modules. An exemplary memory module may include a nonvolatile memory. Examples of nonvolatile memory are described in U.S. Pat. Nos. 5,506,757 and 5,576,936. Other examples of memory modules are described in U.S. Pat. No. 5,539,252 and patent application 2004/0135,668. The subject matter of these patents and patent application are incorporated herein by this reference thereto.

DETAILED DESCRIPTION OF THE DISCLOSURE

Figure 1:
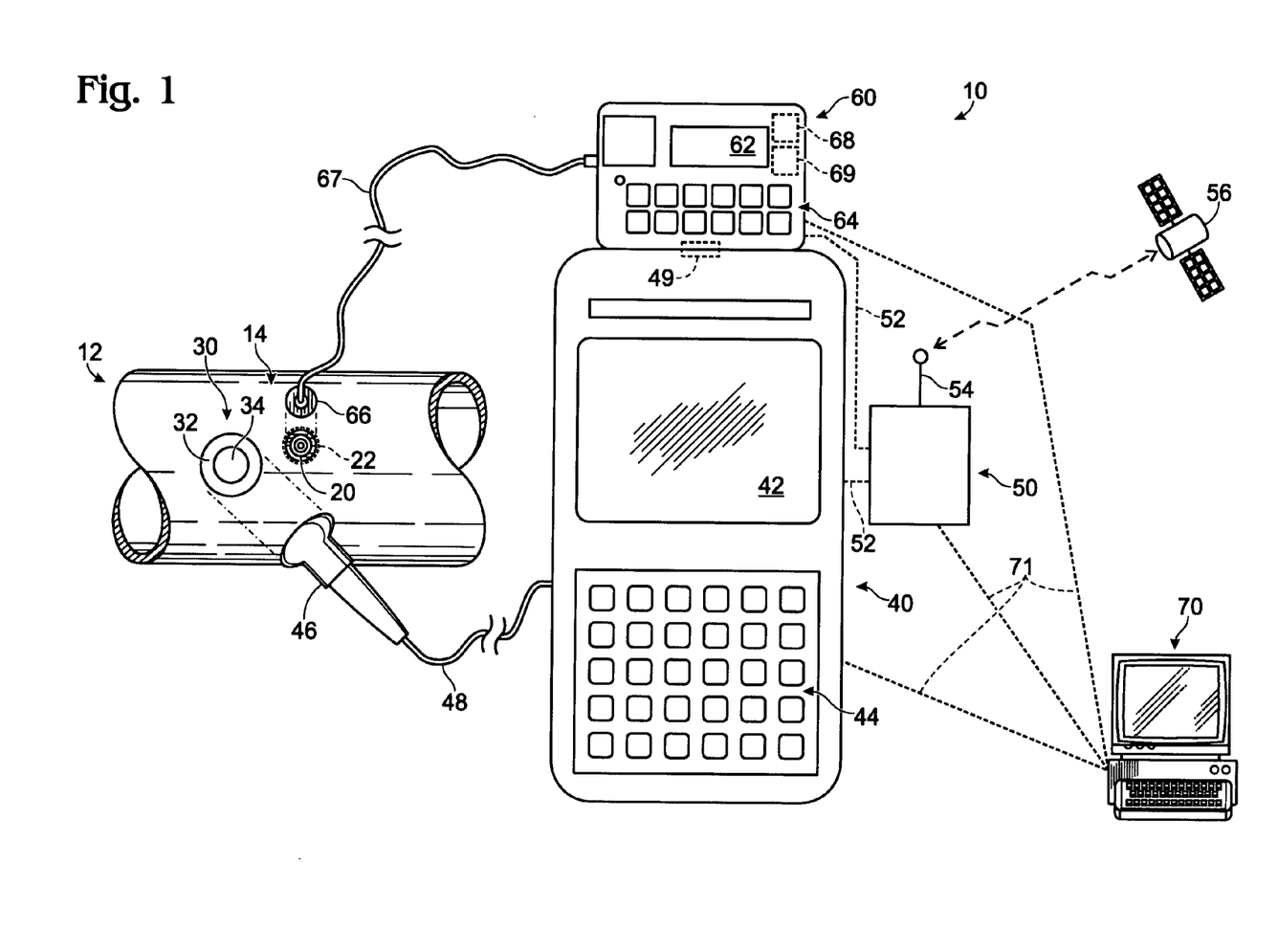
FIG. 1 is a schematic view of a system and apparatus for monitoring a pipeline network having plural inspection sites according to the present disclosure.

Referring to FIG. 1, a system 10 for monitoring a pipeline network 12 having plural inspection sites 14 may include a site identifier 20, a target 30, a measuring instrument or device 40, a location device 50, a data collection device or portable reader 60, and a remote processor or database 70.

Site identifier 20 may be associated with each inspection site 14 along pipeline network 12. Site identifier 20 may be associated with or attached to pipeline network 12 adhesively, mechanically, or by any other suitable method. Site identifier 20 may be associated with inspection site 14 at any desired spot, location, point, position, etc. Site identifier 20 also may form a part of pipeline network 12, such as part of a pipe. The phrase "associated with" may mean that inspection sites 14 are located, attached, and/or positioned at any point, position, location, spot, place, etc. in any way desired in, on, near, adjacent to, and/or along pipeline network 12. In some embodiments, a single site identifier 20 may be associated with plural inspection sites 14. In some embodiments, plural site identifiers 20 may be associated with a single inspections site 14.

Figure 2:
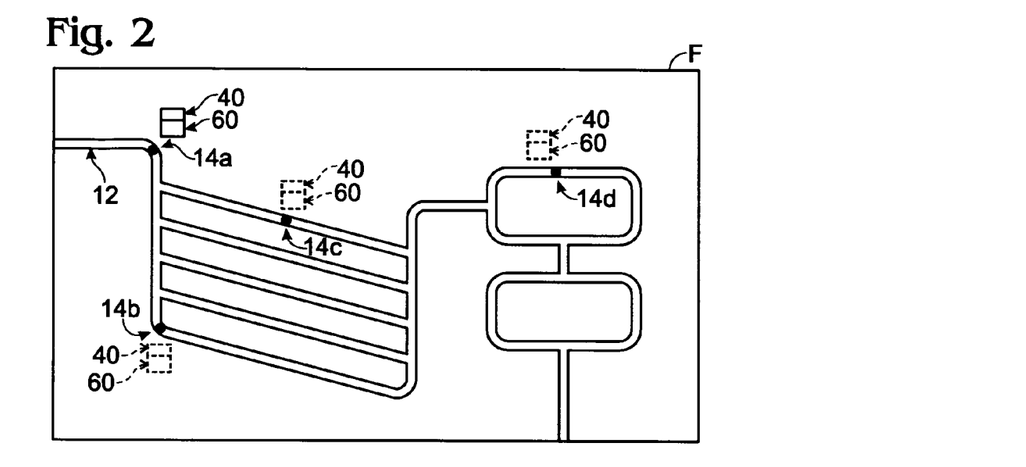
FIG. 2 is a schematic view of an exemplary facility or factory with a pipeline network having plural inspection sites according to the present disclosure.

Site identifier 20 may be any device that allows for unique identification of plural inspection sites 14 in pipeline network 12. For example, site identifier 20 may be a memory module, a radio-frequency identification (RFID) device, a bar-code, and/or any other suitable data-storage device read and/or written by electrical, magnetic, infrared, optical, optical character recognition (OCR), and/or any other technology desired. In some embodiments, site identifier 20 may be configured to be written to once. Site identifier 20 may be configured for read only access. Typically, as illustrated in FIG. 2, such site identifiers 20 are associated with each inspection site 14 in pipeline network 12. Although plural inspection sites 14 typically are employed, for simplicity of disclosure, only a single inspection site 14 is shown in FIG. 1.

Although a particular memory module configuration is shown in FIG. 1, the memory module may take any of a variety of forms, and may include any suitable structure configured to retain or store data. As used herein, the term "data" may refer to singular or plural information, parameters, quantities, characters, files, symbols, etc. in any electronic, written, or other suitable format. The memory module may include any number of electronic or other devices, including (but not limited to) nonvolatile memory, volatile memory, microprocessors, clocks, sensors, etc. As should be apparent, the memory module may utilize any of a variety of memory technologies, including semiconductor memory, magnetic storage media, optical storage media, etc.

The memory module may be equipped with an interface for accessing data stored in the memory, such as to add data to memory, retrieve data from memory, overwrite data in memory, erase memory, etc. In some embodiments, the interface may include one or more electrical contacts, through which a signal may pass. Other interfaces may alternatively or additionally be used. For example, in some embodiments, the memory module may include a wireless or contactless interface providing access to stored data on the memory module.

As used herein, "store," "stored," and "storage" mean that data is at least temporarily placed in memory for retrieval later. Stored data may be temporarily stored or permanently stored. Temporarily stored data may be subsequently erased or overwritten with other data, while permanently stored data may not be subsequently erased or overwritten with other data. Data may be stored in any suitable format, with or without compression and/or encryption and/or password protection.

In some embodiments, the memory module may be a ButtonMemory® manufactured by MacSema, Inc. In some embodiments, the memory module may be an iButton® manufactured by Dallas Semiconductor.

Each memory module associated with a respective inspection site 14 may allow for storage and retrieval of one or more performance parameters, including historic or unique performance parameters, corresponding to such inspection site 14. The one or more performance (or historic or unique performance) parameters may be related to monitoring pipeline integrity, emissions, fugitive emissions, temperature, pressure, chemical compositions, flow-rates, or for any other conditions and/or issues that may be monitored using monitoring system 10.

In some embodiments, the memory module may allow for storage and retrieval of one or more of the following performance (or historical or unique performance) parameters: a unique pipeline inspection site identifier (e.g., a serial number), site location data of a corresponding inspection site 14, a material type corresponding to inspection site 14, a nominal pipe or wall thickness corresponding to inspection site 14, a minimal pipe or wall thickness corresponding to inspection site 14, a current pipe or wall thickness measurement corresponding to inspection site 14, a last monitoring date corresponding to inspection site 14, a last pipe or wall thickness measurement on the last date monitored corresponding to inspection site 14, and the identity of the last user who performed an inspection corresponding to inspection site 14.

Monitoring system 10 may include a cover 22 that is configured to protect site identifier 20. Cover 22 may be temporarily secured over site identifier 20 to shield site identifier 20 from potential damage. Cover 22 may be held in place by frictional, magnetic, and/or mechanical force, and/or by other means.

Target 30 may include a target rim 32 and a hole 34. Target 30 may be attached to pipeline network 12 adhesively, mechanically, or by any other suitable method. Target 30 may take any convenient shape, including circular, oblong, square, or rectilinear. Target 30 may be associated with each inspection site 14 to define a performance data collection point at such inspection site 14. The performance data collection point may be a point, position, spot, and/or location on a pipe or along pipeline network 12 for collecting performance data.

Hole 34 may be fittably sized to receive a sensor 46 of measuring device 40. The performance data collection point may be defined as a point that is fittably sized to receive sensor 46 for collecting performance data. Target 30 may be advantageous for generating a consistent (e.g., accurate and/or precise) measurement for collecting performance data at inspection site 14. Target 30 may indicate the data collection point in any way desired. In some embodiments, target 30 and site identifier 20 may form a unitary component associated with or attached at inspection site 14. The unitary component may be a plate to which site identifier 20 is attached and comprised of target 30 including 34. The plate may be metal, plastic, or any other suitable material.

FIG. 2 illustrates an exemplary facility or factory F comprising a pipeline network 12. Pipeline network 12 may include a network of intricate, non-linear pipes, flanges, fasteners, vessels, pressure vessels, etc. located around and throughout facility or factory F. In other embodiments, pipeline network 12 may be located around and throughout a plant, a power plant, a ship, a submarine, or in any other location. Pipeline network 12 may include multiple pipes with each pipe configured to carry different fluids. Pipeline network 12 may include any type of material, including metals, plastics, etc. Plural inspection sites 14 may be associated with pipeline network 12.

For illustrative purposes only, inspection sites 14a, 14b, 14c, and 14d may be associated with pipeline network 12. In other embodiments, pipeline network 12 may have as many inspection sites 14 as desired, including hundreds or even thousands. A site identifier 20 and a target 30 may be associated with or attached at each inspection site 14. Portable reader 60 and/or measuring device 40 may be transported to any of inspection sites 14a-d for monitoring.

Now returning to FIG. 1, monitoring system 10 may include measuring device 40. Measuring device 40 may include a screen 42, a plurality of keys 44, a sensor 46, a first connector 48, and a second connector 49. Measuring device 40 may be operable to make certain desired measurements of inspection site 14. Measuring device 40 may be operable to collect performance data of inspection site 14. The performance data may be related to pipeline integrity, emissions, fugitive emissions, temperature, pressure, chemical compositions, flow-rates, or for any other conditions and/or issues for which data may be collected using monitoring system 10.

Screen 42 may be configured to view data stored in measuring device 40, or accessible thereby. Keys 44 may include an on/off key, a calibration key, a plurality of key pad keys, a set of scroll left/right keys, and/or a set of scroll up/down keys. In other embodiments, measuring device 40 may include a touch-pad, a touch-screen, voice input or another suitably configured data entry device or tool. Measuring device 40 may be configured to control partially or entirely the operation of location device 50 and/or portable reader 60. Alternatively, measuring device 40 may act as a peripheral to another device, such as location device 50 and/or portable reader 60, where location device 50 and/or portable reader 60 is configured to control partially or entirely the operation of measuring device 40.

Sensor 46 may be configured to make measurements and/or collect performance data of inspection site 14. In some embodiments, sensor 46 may be fittably configured to fit into rim 32 on target 30 associated with inspection site 14. Sensor 46 may transmit or send data, including performance data, to measuring device 40 of a selected or present inspection site 14 being measured via a first connector 48.

First connector 48 may allow data to pass between measuring device 40 and sensor 46. First connector 48 may connect measuring device 40 to sensor 46. First connector 48 may create an electrical connection, an optical connection, a radio frequency (RF) connection, a wireless connection, or any other type of connection desired. First connector 48 may be a cable.

In some embodiments, measuring device 40 may measure the performance of pipeline network 12 using ultrasonic inspection, mechanical inspection, optical inspection, electromagnetic and electronic inspection, thermal inspection, chemical and analytical inspection, infrared thermography, magnetic flux leakage (MFL), radioisotope gamma radiometry, radiography, or any other method desired. Measuring device 40 may collect performance data from the measurement. In some embodiments, the performance data may include a current pipe or wall thickness of inspection site 14.

In some embodiments, measuring device 40 may be an ultrasound device, such as a Panametrics Corrosion Thickness Gage 37DL Plus. Measuring device 40 may be a modified Panametrics Thickness Gage 37DL Plus. The Panametrics Thickness Gage 37DL Plus may be controlled entirely or in part by portable reader 60. Measuring device 40 may be a Krautkramer DMS2E. Measuring device 40 may be a modified Krautkramer DMS2E. The Krautkramer DMS2E may be controlled entirely or in part by portable reader 60.

Measuring device 40 may be connected to portable reader 60 via a second connector 49. Second connector 49 may allow measuring device 40 and portable reader 60 to connect and interface. Second connector 49 may allow data to pass between measuring device 40 and portable reader 60. Second connector 49 may be in the form of an electrical connection, an optical connection, an RF connection, a wireless connection, or any other type of connection desired. Second connector 49 may be a cable. Sensor 46 may communicate with portable reader 60 via first connector 48 and second connector 49. It will be appreciated that sensor 46 may be connected via first connector 48 to portable reader 60, and may communicate with measuring device 40 via second connector 49 and/or with location device 50 via a third connector 52.

Monitoring system 10 may include location device 50. Location device 50 may be any device capable of determining site location data. Location device 50 may be a global positioning satellite (GPS) device. Location device 50 may be a Galileo positioning system device. Location device 50 may use GPS, Galileo, or any other suitable technology for gathering site location data. Location device 50 may have an antenna 54 for receiving a signal from, for example, GPS satellites 56 and/or Galileo satellites 56.

Location device 50 may have its own controls, or act as a peripheral to another device, such as portable reader 60 and/or measuring device 40, where portable reader 60 and/or measuring device 40 is configured to control operation of location device 50. Location device 50 may be configured to control partially or entirely the operation of measuring device 40 and/or portable reader 60.

Location device 50 may be permanently or temporarily connected via a third connector 52 with portable reader 60 and/or measuring device 40. Third connector 52 may allow location device 50 and portable reader 60 to connect and interface. Third connector 52 may allow data to pass between location device 50 and portable reader 60. Third connector 52 may be in the form of an electrical connection, an optical connection, an RF connection, a wireless connection, or any other type of connection desired. Third connector 52 may be a cable. Portable reader 60 may store data passed from location device 50. It will also be appreciated that third connector 52 may allow location device 50 and measuring device 40 to connect and interface either by directly connecting third connector 52 to measuring device 40 or indirectly via portable reader 60.

Various site location data may be associated with a corresponding inspection site 14. Site location data may include a distance value and a direction value. The distance value may include a measurable distance between points (e.g., inches, feet, meters, etc.). The direction value may include coordinates or bearings (e.g., North, South, East, West, Up, Down, Left, Right, Starboard, Port, etc.). The distance value and the direction value, or any combination of distance values and direction values, may be used to determine the location of a selected or destination inspection site 14. Site location data may be in any suitable format, such as latitude coordinates and longitude coordinates, GPS coordinates, Galileo coordinates, user-defined values or coordinates (e.g., "5 feet above the third door on the left"), and/or any combination thereof.

As described above, site identifier 20 (e.g., the memory module) may store site location data corresponding to such inspection site 14 associated with site identifier 20. Portable reader 60 may store site location data corresponding to each inspection site 14 in pipeline network 12.

Monitoring system 10 may also include portable reader 60. Portable reader 60 may include a screen 62, a plurality of keys 64, a reader/writer 66, a fourth connector 67, an internal on-board memory 68, and a processor 69.

Screen 62 may be configured to view data in portable reader 60. Screen 62 may also be configured to view data in measuring device 40 and/or in location device 50. Portable reader 60 may be configured to partially or entirely control measuring device 40 and/or location device 50. Keys 64 may include an on/off key, a calibration key, a plurality of key pad keys, a set of scroll left/right keys, and/or a set of scroll up/down keys. Keys 64 may be configured to control portable reader 60. In other embodiments, portable reader 60 may include a touch-pad, a touch-screen, voice input, or another suitably configured data entry device or tool in lieu of and/or in addition to keys 64.

Portable reader 60 may be configured to control partially or entirely the operation of measuring device 40 and/or location device 50. Keys 64 may also be configured to control measuring device 40 (via second connector 49), and/or location device 50 (via third connector 52). Alternatively, portable reader 60 may act as a peripheral to another device, such as measuring device 40 and/or location device 50, where measuring device 40 and/or location device 50 is configured to control partially or entirely the operation of measuring device 40.

Portable reader 60 and site identifier 20 may be complementary-configured for allowing data, and/or parameters to pass. In some embodiments, reader/writer 66 may be associated with portable reader 60 and site identifier 20 may be complementary-configured so that portable reader 60 may read data from and/or write data to site identifier 20, and vice-versa. An interface on reader/writer 66 may be aligned with an interface on site identifier 20 so that data may be transferred between reader/writer 66 and site identifier 20. Reader/writer 66 may transmit data to and/or from site identifier 20 electrically, optically, with radio waves, and/or with infrared waves, etc. Reader/writer 66 may be a sensor or probe.

Reader/writer 66 may send or retrieve data from portable reader 60 via fourth connector 67. Fourth connector 67 may allow data to pass between portable reader 60 and reader/writer 66. Fourth connector 67 may connect portable reader 60 to reader/writer 66. Fourth connector 67 may be in the form of an electrical connection, an optical connection, an RF connection, a wireless connection, or any other type of connection desired. Fourth connector 67 may be a cable. It will be appreciated that reader/writer 66 may communicate with measuring device 40 via fourth connector 67 and second connector 49, and/or with location device 50 via fourth connector 67 and third connector 52. It will also be appreciated that reader/writer 66 may be connected to measuring device 40 via fourth connector 67, and may communicate with portable reader 60 via second connector 49 and/or with location device 50 via third connector 52.

Portable reader 60 may include internal on-board memory 68. Internal on-board memory 68 may take any of a variety of forms, and may include any suitable structure configured to retain or store data. Internal on-board memory 68 may include any number of electronic or other devices, including (but not limited to) nonvolatile memory, volatile memory, microprocessors, clocks, sensors, etc. As should be apparent, internal on-board memory 68 may utilize any of a variety of memory technologies, including semiconductor memory, magnetic storage media, optical storage media, etc. Internal on-board memory 68 may retain or store data for measuring device 40, location device 50, and/or portable reader 60.

Internal on-board memory 68 may store or receive for storage the one or more performance (or historical or unique performance) parameters corresponding to each inspection site 14. Internal on-board memory 68 may store or receive for storage the one or more performance (or historical or unique performance) parameters corresponding to such site identifier 20 (e.g., the memory module) associated with a selected or present inspection site 14. Internal on-board memory 68 may store or receive for storage performance data of inspection site 14. Internal on-board memory 68 may store or receive for storage performance data from measuring device 40.

Internal on-board memory 68 may store or receive for storage site location data corresponding to each inspection site 14 in pipeline network 12. Internal on-board memory 68 may store or receive for storage present site location data from a site identifier 20 associated with a present inspection site 14.

Processor 69 may be configured to analyze, compute, and/or compare data retrieved by and/or stored in portable reader 60. Processor may analyze, compute, and/or compare data associated with a selected inspection site 14 in real-time and/or while at, near, around, adjacent to, and/or in proximity to the selected inspection site 14. In some embodiments, processor 69 may verify the one or more performance parameters corresponding to and/or associated with a respective inspection site 14. In some embodiments, processor 69 may compare the one or more performance parameters corresponding to and/or associated with a present inspection site 14 with performance data of the present inspection site 14.

Processor 69 may validate, e.g., the accuracy and/or precision, of the performance data in real time or while on-location at the present inspection site 14. Either a user or processor 69 may interpret the performance data in real time or while on-location at the present inspection site 14. Either a user or processor 69 may validate the performance of the present inspection site 14 and/or pipeline network 12 in real time or while on-location at the present inspection site 14. Either a user or processor 69 may validate the performance of monitoring system 10 in real time or while on-location at the present inspection site 14.

In some embodiments, processor 69 may be configured to compare site location data of the present inspection site 14 with reference site location data to determine a location of a destination inspection site 14. The site location data corresponding to the destination inspection site 14, or any other inspection site 14, may be the reference site location data. It will be appreciated that processor 69 may determine the location of the destination inspection site 14 without the use of location monitoring device 50.

In some embodiments, portable reader 60 may be a suitably configured PDA device, notebook computer, or other suitable portable or hand-held computing or processing device. In some embodiments, portable reader 60 may be a Button-Reader® manufactured by MacSema, Inc., that communicates (e.g., reads/writes) with the ButtonMemory®. The ButtonReader® may transmit, download and/or upload data to the ButtonMemory®.

In some embodiments portable reader 60 may be a modified ButtonReader®. The ButtonReader® may control entirely, or in part, measuring device 40 and/or location device 50. The ButtonReader® may communicate with measuring device 40 and/or location device 50 for transmitting data. The Panametrics Thickness Gage 37DL Plus may be connected to the ButtonReader® via second connector 49. Krautkramer DMS2E may be connected to the ButtonReader® via second connector 49.

In some embodiments, as illustrated in FIG. 1, portable reader 60 and measuring device 40 may form a unitary portable instrument. The unitary portable instrument may be configured so that one or more measuring devices 40, one or more location devices 50, one or more portable readers 60 and/or any combination thereof is integrated as one unit, integrated as connected components, or integrated in any way desired. As shown in dashed lines in FIG. 2, the unitary portable instrument including portable reader 60 may be transported as needed to inspection sites 14 along pipeline 12 for monitoring. It will be appreciated that measuring device 40 may be located at inspection site 14 for performing constant or real-time monitoring.

Monitoring system 10 may include remote processor or database 70. Remote database 70 may be any device allowing for storage, retrieval, and/or processing of data, such as a computer. Remote database 70 may contain any parts needed for storing, retrieving, and/or processing data, such as a memory module, a microchip, a screen, and a keyboard. Remote database 70 may use a fifth connector 71 to interface with measuring device 40, location device 50, and/or portable reader 60, allowing data to pass. Fifth connector 71 may be in the form of an electrical connection, an optical connection, an RF connection, a wireless connection, or any other type of connection desired. Fifth connector 71 may be a cable. Remote database 70 may store and/or process any data of the present disclosure. In some embodiments, remote database 70 may be connected via fourth connector 67 to a reader/writer 66. Remote database 70 may be able to read data from and/or write data to site identifier 20 (e.g., a memory module) via reader/writer 66.

Figure 3:
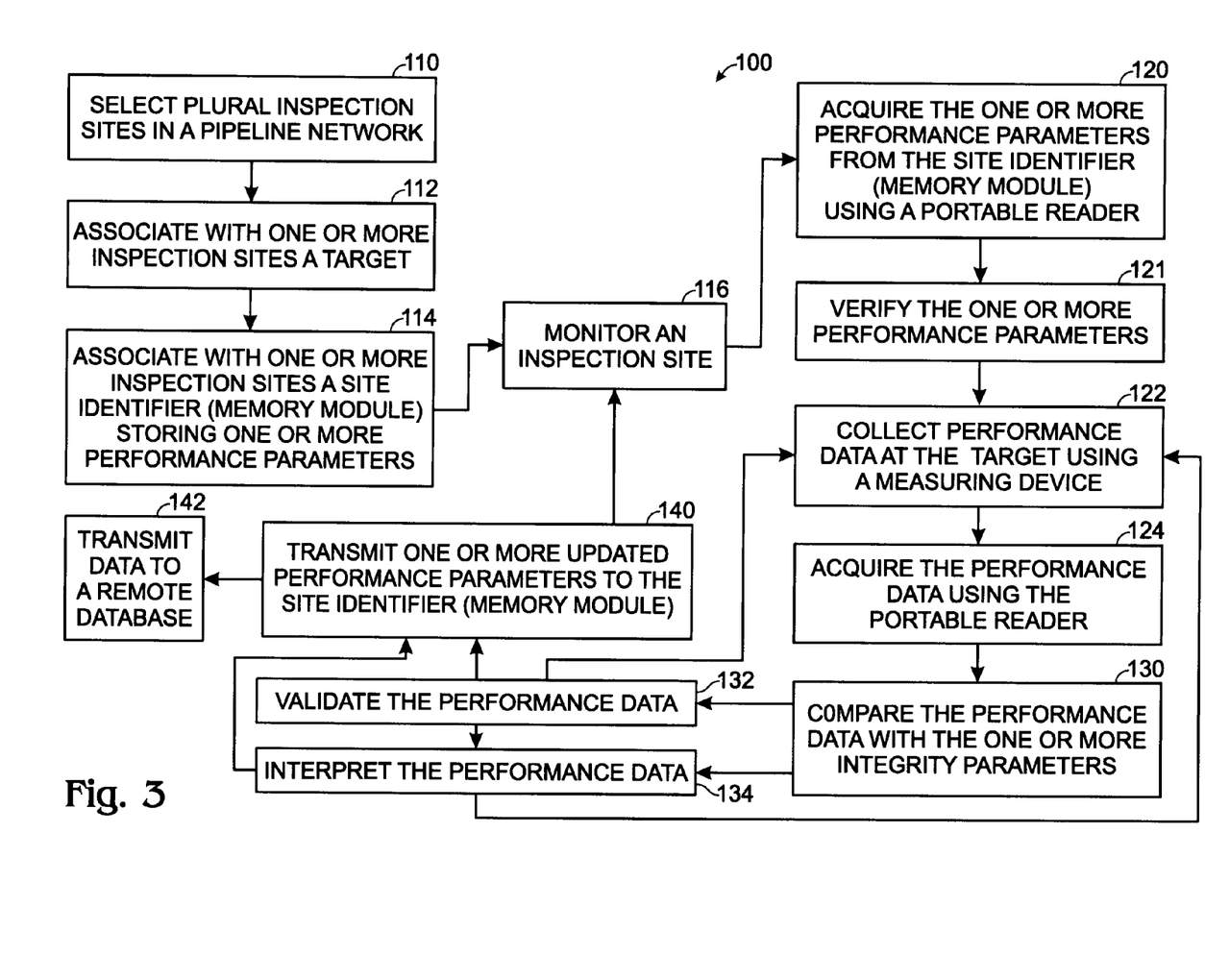
FIG. 3 is a flow chart depicting an exemplary method according to the present disclosure.

FIG. 3 is a flow chart depicting an exemplary method 100 for monitoring inspection sites 14. At block 110, plural inspection sites 14 are selected and associated with pipeline network 12. Inspection sites 14 may be associated with one or more pipes, fasteners, flanges, valves, vessel, pressure vessels, etc. in pipeline network 12.

At block 112, a target 30 may be associated with each inspection site 14.

At block 114, a site identifier 20 may be associated with each inspection site 14. Site identifier 20 may store or contain one or more performance parameters associated with such inspection site 14. In some embodiments, site identifier 20 may be a memory module. Portable reader 60 and/or remote database 70 may be used to write to site identifier 20 the one or more performance parameters associated with such inspection site 14.

At block 116, an inspection site 14 for monitoring may be selected. Portable reader 60 may be transported to the selected inspection site 14. A unitary portable instrument that may include portable reader 60, measuring device 40 and/or location device 50 may be transported to the selected inspection site 14. Using FIG. 2 as an example, inspection site 14a may be selected. The unitary portable instrument including portable reader 60 may be transported to inspection site 14a.

At block 120, the one or more performance (or historical or unique) parameters stored on site identifier 20 associated with the selected inspection site 14 may be acquired by portable reader 60. Reader/writer 66 may read site identifier 20 to acquire the one or more performance parameters. In some embodiments, portable reader 60 may acquire the one or more performance parameters from the memory module. The one or more performance parameters acquired may include one or more performance parameters stored on site identifier 20 corresponding to the selected inspection site 14. Portable reader 60 may acquire the one or more performance parameters onsite and/or in real time. For example, as illustrated in FIG. 2, portable reader 60 may acquire the one or more performance parameters corresponding to inspection site 14a while portable reader 60 is located at or around inspection site 14a. Screen 62 of portable reader 60 may indicate that data was transmitted from site identifier 20 to portable reader 60.

Turning to block 121 of FIG. 3, portable reader 60 may be suitably programmed to compare the one or more performance parameters with data stored on portable reader 60 to verify that the data being compared matches. For example, portable reader 60 may compare the last pipe or wall thickness reading and the last date of the last pipe or wall thickness reading acquired in block 120 with data stored with portable reader 60 including a last pipe or wall thickness reading and a last date of a last pipe or wall thickness to verify that the data matches. Portable reader 60 may provide an alert if the data stored with portable reader 60 does not match the one or more performance parameters stored with site identifier 20.

At block 122, measuring device 40 may collect performance data of the selected inspection site 14. In some embodiments, sensor 46 of measuring device 40 may be placed in hole 34 on target 30, i.e., the performance data collection point, for taking a reading or measurement to collect performance data. In some embodiments, performance data collected by measuring device 40 may be the current pipe or wall thickness associated with inspection site 14, such as at hole 34 of target 30. In some embodiments, the performance data may be collected after a visual or other inspection without using measuring device 40.

In some embodiments, one or more of the performance data may be collected. For example, measuring device 40 may collect plural performance data over a predetermined time interval. The time interval may be in seconds, minutes, hours, days, etc.

At block 124, the performance data of block 122 may be acquired by portable reader 60. Portable reader 60 may acquire the performance data while onsite and/or in real time. For example, as illustrated in FIG. 2, portable reader 60 may acquire the performance data of inspection site 14a while portable reader 60 is located at or around inspection site 14a.

Portable reader 60 may be configured to manually receive the performance data. In some embodiments, keys 64 may be used to manually type into portable reader 60 the performance data. In some embodiments, pressing a key 64 may cause portable reader 60 to communicate with measuring device 40 to retrieve the collected performance data.

Portable reader 60 may be suitably programmed to retrieve or acquire automatically the performance data from measuring device 40. In some embodiments, portable reader 60 may be programmed to perform a reading process to read measuring device 40. The reading process may determine whether measuring device 40 has collected performance data. The reading process may begin reader/writer 66 receives data from site identifier 20. The reading process may end when measuring device 40 has collected the performance data. Portable reader 60 may be programmed to retrieve or acquire the performance data from measuring device 40 after the performance data reading has substantially stabilized.

The reading process may end after a predetermined amount of time if measuring device 40 does not collect the performance data and/or does not collect a substantially stabilized reading. Portable reader 60 may alert the user if performance data has not been acquired in the predetermined time. The alert may include resetting portable reader 60 and/or prompting the collection of performance data in block 122. Screen 62 of portable reader 60 may indicate that data was transmitted from measuring device 40 to portable reader 60.

Portable reader 60 may be suitably programmed to acquire the performance data collected over the interval in block 122 from measuring device 40.

Now turning to block 130 in FIG. 3, portable reader 60 may compare, compute, and/or analyze data. Portable reader 60 may perform one or more tests in real time and/or onsite at or around inspection site 14. The tests may include validation and/or interpretation of data. Portable reader 60 may be suitably programmed to compare one or more of the performance data collected over the interval in block 122 from measuring device 40.

In block 132, portable reader 60 may compare the performance data acquired in block 122 with one or more performance parameters acquired in block 120 to validate the performance data acquired in block 124. The validation of performance data may be performed onsite and/or in real time. The validation of performance data may provide real-time feedback of the reliability and/or accuracy of the performance data acquired in block 122. Portable reader 60 may alert a user as required if problems exist with the reliability and/or accuracy of the performance data acquired in block 124.

In some embodiments, comparing the one or more performance parameters stored with site identifier 20, with data stored with portable reader 60, as described in block 120, may help validate the performance data collected by confirming onsite that the performance data was collected at the correct inspection site 14 in the correct order, etc. In some embodiments, validation of performance data may include portable reader 60 determining that the performance data is out of range. For example, the current pipe or wall thickness acquired in block 124 may be compared to the nominal pipe or wall thickness corresponding to the selected inspection site 14. In some embodiments, if the current pipe or wall thickness is plus or minus about 12.5% of the nominal pipe or wall thickness, then the current pipe or wall thickness data may be out of range.

In some embodiments, validation of performance data may include portable reader 60 determining if measuring device 40 collected imprecise and/or inaccurate performance data (e.g., it took a "bad" reading). For example, the current pipe or wall thickness acquired in block 124 may be above the nominal pipe or wall thickness of the corresponding inspection site 14. In some embodiments, when the current pipe or wall thickness is greater than about 0.005 of nominal pipe or wall thickness, measuring device 40 collected bad performance data.

One or more responses may occur based on the validation of the performance data acquired in block 124. If the performance data is determined to be invalid (for example, out of range, inaccurate, and/or imprecise) or the data collected is determined to be bad, then portable reader 60 may prompt measuring device 40 or the user to acquire or collect new performance data in block 122. In some embodiments, portable reader 60 may automatically prompt measuring device 40 to collect a new current pipe or wall thickness reading. Invalid performance data readings may also mean a problem exists with measuring device 40 or elsewhere in monitoring system 10. In response, appropriate changes, tuning, calibrations or adjustments may be made to monitoring system 10, such as, moving, adjusting, replacing, repairing, etc. measuring device 40 an/or monitoring system 10.

In block 134, portable reader 60 may compare the performance data acquired in block 124 with one or more performance parameters acquired in block 120 to interpret the performance data acquired in block 124. The interpretation of performance data may be performed onsite and/or in real time. The interpretation of performance data may provide real-time feedback of the status of pipeline network 12 and/or of monitoring system 10. Portable reader 60 may alert a user as required based on the interpretation.

For example, in some embodiments, the interpretation of performance data may determine if pipeline network 12 is at optimal performance. Portable reader 60 may determine that the current pipe or wall thickness acquired in block 124 is moderately or severely below the nominal pipe or wall thickness corresponding to inspection site 14. Portable reader 60 may also determine the current pipe or wall thickness acquired in block 124 is below the minimal level of thickness for the pipe of the corresponding inspection site 14. Portable reader 60 may be configured to only interpret performance data determined to be valid in block 132.

One or more responses may occur based on the interpretation of the performance data acquired in block 124. The performance data may signal that pipeline network 12 is not at optimal performance. In response, appropriate changes, tuning, calibrations, or adjustments may be made to pipeline network 12. In response, a user may adjust, replace and/or repair the pipes, flanges, etc., in pipeline network 12. The performance data may alert a user that a problem exists with one or more components of monitoring system 10. For example, a faulty portable reader 60 or measuring device 40 may exist. In response, appropriate changes, replacements, repairs, tuning, or adjustments may be made to monitoring system 10.

In block 140, data may be transmitted (e.g., written to) to site identifier 20 using reader/writer 66. In some embodiments, one or more updated performance parameters may be transmitted to site identifier 20 (e.g., the memory module) associated with the selected inspection site 14 for storage. For example, the performance data acquired in block 124 and the date on which the performance data was collected in block 122 and/or acquired in block 124 may be transmitted to the selected site identifier 20 for storage. The identity of the last user who performed an inspection corresponding to inspection site 14 may also be transmitted (e.g., written to) site identifier 20. In this manner, site identifier 20 may maintain a historical record of one or more historical performance parameters that are unique to such inspection site 14 associated with site identifier 20.

Portable reader 60 may be locked manually and/or automatically to prevent overwriting of data stored in internal on-board memory 68 and/or to prevent measuring device 40 from collecting performance data. Portable reader 60 may lock data associated with a selected site identifier 20 after reader/writer 66 has transmitted data to such site identifier 20. Portable reader 60 may be locked manually, e.g., using keys 64. Portable reader 60 may be configured to lock automatically after a predetermined delay. Screen 62 of portable reader 60 may indicate that portable reader 60 is locked.

Portable reader 60 may be unlocked to allow for modification of stored data and/or to allow measuring device 40 to collect performance data. Portable reader 60 may be unlocked manually. Portable reader 60 may be suitably programmed to unlock for a selected inspection site 14 after data is transmitted from site identifier 20 associated with the selected inspection site 14 to reader/writer 66.

In some embodiments, portable reader 60 may be suitably programmed to verify whether data, such as the one or more updated performance parameters, have been written to site identifier 20. For example, portable reader 60 may provide an alert if portable reader 60 has not written to site identifier 20 after a predetermined time. The predetermined time may be some time interval after portable reader 60 validated the performance data in block 132 and/or interpreted the performance data in 134. The alert may include prompting the collection of new performance data in block 122 and/or discrediting the performance data already collected and stored in portable reader 60. This verification may confirm that performance data was collected at inspection site 14. This verification may confirm that the performance data was validated by using the one or more performance values stored on site identifier 20.

In block 142, data may be transmitted, sent, or uploaded to remote database 70 for storage, analysis, etc.

Returning to block 116, another inspection site 14 may be selected for monitoring. Referring again to FIG. 2, a user at inspection site 14a may select to monitor inspection site 14b, 14c, or 14d. The unitary portable instrument including portable reader 60 may be transported to the next-selected inspection site 14. The steps disclosed in blocks 110-140 may be repeated for inspection site 14b, 14c, and/or 14d as necessary.

Figure 4:
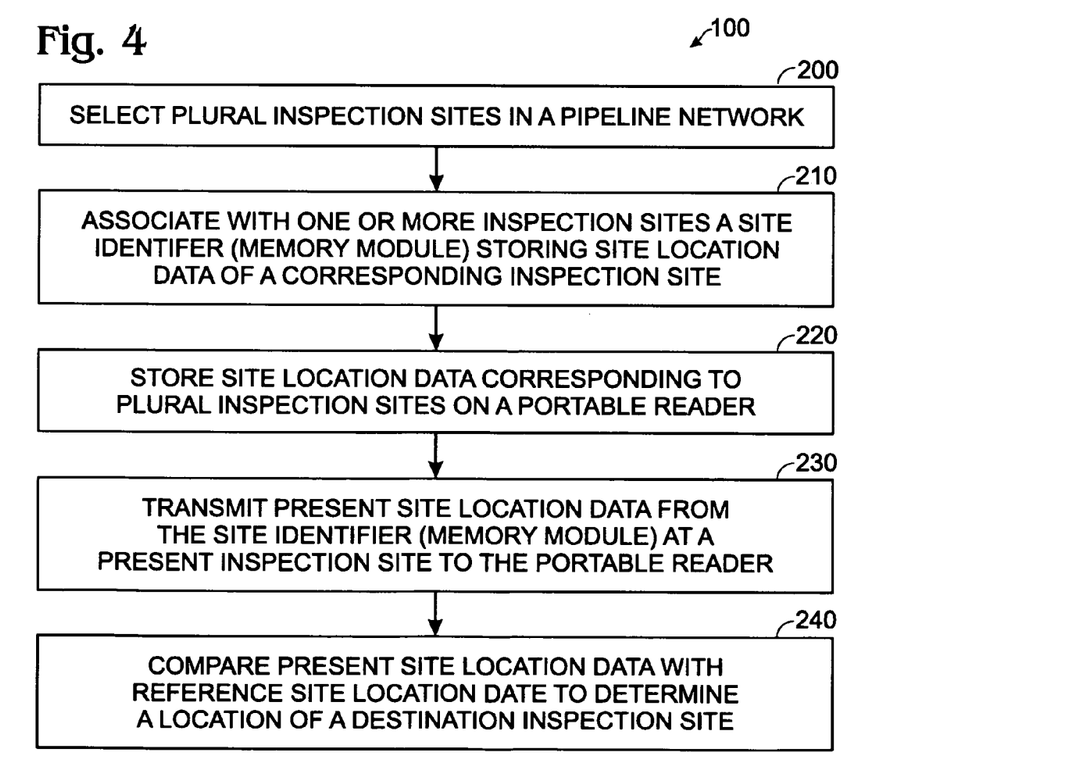
FIG. 4 is a flow chart depicting an exemplary method according to the present disclosure.

Now referring to the flow chart in FIG. 4, method 100 may also allow for determining the location of inspection sites 14 along pipeline network 12. At block 200, site location data may be associated with each inspection site 14 selected in block 110. Location device 50 may be used to determine site location data for each inspection site 14. Blueprints, survey tools (i.e., lasers), or any manual or other method to determine site location data may also be used.

In some embodiments, site location data may be determined while onsite or while associating site identifier 20 with inspection site 14 at block 114 in FIG. 3. Site location data may be associated with inspection site 14, site identifier 20, and/or target 30 in any way desired in, on, near, adjacent to, and/or along pipeline network 12 at any desired point, position, location, spot, place, etc. It will be appreciated that any method described, or other suitable method, may be employed to determine site location data of each inspection site 14. Any of the various site location data described above may be associated with a corresponding site inspection site 14.

At block 210 of FIG. 4, each site identifier 20 (e.g., the memory module) associated with inspection site 14 may store the determined site location data corresponding to such inspection site 14. Site location data may be stored in a machine-readable format, as a barcode, as electronic data, or in any other desired format. Using FIG. 2 as an illustration, inspection sites 14a, 14b, 14c and 14d may be selected. Site location data for inspection site 14a is stored at site identifier 20 associated with inspection site 14a. Likewise, site location data for 14b is stored at inspection site 14b, etc.

At block 220 of FIG. 4, the determined site location data for each inspection site 14 may be sent to a database accessible from any inspection site 14. In the illustrated embodiment, the database is stored in internal on-board memory 68 in portable reader 60. The database may also be stored on each site identifier 20 and/or on remote database 70. The site location data may include reference site location data. The reference site location data may be one or more fixed locations, including any suitable inspection site 14 or any other location desired. Again using FIG. 2 as an example, site location data corresponding to each of inspection site 14a, 14b, 14c, and 14d is stored in portable reader 60.

The site location data in blocks 200 and 210 may be used to determine the location of inspection sites 14 along pipeline network 12. For example, the site location data may be used to determine the location of the inspection site selected for monitoring in block 116 of FIG. 3. In block 230 of FIG. 4, site location data may be transmitted from site identifier 20 (e.g., the memory module) at a present inspection site 14 to portable reader 60. Reader/writer 66 of portable reader 60 may be used to acquire site location data from site identifier 20. In some embodiments, portable reader 60 may be configured to read a bar-code storing site location data associated with inspection site 14.

At block 240, portable reader 60 may compare site location data from the present inspection site 14 to reference site location data to determine the location of a destination inspection site. In one embodiment, keys 64 on portable reader 60 may be used to select any desired destination inspection site 14 stored in portable reader 60. In this manner, a location, e.g., a relative distance value and a relative direction value, between the present inspection site and the destination inspection site may be determined. In this manner, a user may locate the destination inspection site from the present inspection site in real time. It will be appreciated that since all site location data is stored in portable reader 60 and/or at each inspection site 14 associated with pipeline network 12, location device 50 is not needed for determining a location of a destination inspection site 14.

In some embodiments, the relative distance value and the relative direction value determined by portable reader 60 may be adjusted for increased precision and/or accuracy. For example, it is appreciated that current GPS, Galileo, or other location technology may be unable to provide exact or pinpoint coordinates corresponding to an actual location. Site location data (e.g., GPS coordinates) determined for each inspection site 14 may therefore be off by a few degrees, feet, etc. relative to the exact or pinpoint coordinates of the actual location of inspection site 14 in pipeline network 12. Accordingly, the relative distance value and/or the relative direction value determined by portable reader 60 between the present inspection site 14 and the destination inspection site 14 may be off by a few degrees, feet, etc.

Portable reader 60 may be suitably programmed to allow a user to enter data to account for any disparity between the location of the destination inspection site 14 determined by portable reader 60 and the actual location of the destination inspection site 14. The data may be input into portable reader 60 onsite. Portable reader 60 may reconfigure in real-time the relative distance value and the relative direction value to substantially correspond with the exact or pinpoint coordinates of the actual location.

In another example, it is appreciated that facilities F, etc. are generally positioned and/or angled at some degree of deviation relative to a true north reading. A true north reading may be obtained using a magnetic compass or other suitable means. The degree of deviation from true north may be determined by using a compass, blueprints of facility F, etc., or using any other suitable method. The degree of deviation may be recorded as the degree that facility F, etc. is position or angled relative to true north.

Site location data determined from GPS may be based on a true north reading. The location (e.g., the relative distance value and the relative direction value) determined by portable reader 60 between the present inspection site and the destination inspection site may be based on a true north reading. Accordingly, the location determined by portable reader 60 may be inaccurate by whatever degree of deviation the facility F, etc., is angled or positioned relative to true north.

Portable reader 60 may be suitably programmed to allow a user to input data to substantially account for the degree of deviation facility F, etc. is from true north. The inputted data may be the degree that facility F, etc. is positioned or angled relative to true north. The data may be inputted into portable reader 60 onsite. Portable reader 60 may reconfigure in real-time the relative distance value and the relative direction value to substantially account for the degree of deviation of facility F relative to true north.

Using FIG. 2 as an example, inspection site 14a may be the present inspection site, inspection site 14b may be the destination inspection site, and inspection site 14b may also be the reference site location data. The location data for the present inspection site 14a is retrieved from the database in portable reader 60. Keys 64 are used to select destination inspection site 14b. Portable reader 60 compares site location data for present inspection site 14a to reference site location data of inspection site 14b to determine a location of destination inspection site 14b. Portable reader 60 may calculate a distance value and a direction value between present inspection site 14a and destination inspection site 14b. Portable reader 60 may adjust the calculated distance value and direction value as described above. In other embodiments, inspection site 14c, 14d, or another location may serve as the reference site location data.

In some embodiments, location device 50 may be associated or coupled with the database stored on portable reader 60 to determine the location of a destination inspection site 14. The user may take a location-data reading from any location using location device 50. This reading may serve as the reference point. A user may then use keys 44 on portable reader 60 to select a destination inspection site. As described in the last paragraph, portable reader 60 may then calculate a distance value and a direction value between a present inspection site 14 and the destination inspection site 14. In some embodiments, a location of a destination inspection site 14 may be determined using only the site location data stored on portable reader 60.

In some embodiments, a location of a destination inspection site 14 may be determined using a combination of GPS and/or Galileo coordinates with user-defined values. For example, the GPS and/or Galileo coordinates may be used to determine a selected location near one or more inspections sites 14. The user-defined values may then define and/or be used to determine the distance and the direction of the one or more inspections sites 14a relative to the selected location.

System 10 is not limited to the systems, apparatus, and methods depicted in FIGS. 1-4. In some embodiments, monitoring system 10 may be used for locating and/or monitoring fugitive emissions inspection sites along pipeline network 12. Fugitive emissions may generally include leaks from, or in the connections between, flanges, pipes, pumps, compressors, valves, vessels, pressure vessels, etc. Monitoring system 10 may comprise any or all components described above, including a site identifier 20 (such as a memory module) associated with one or more fugitive emissions inspection sites, and a measuring device.

In some embodiments, the memory module may allow for storage and retrieval of one or more performance (or historical or unique performance) parameters corresponding to a fugitive emissions inspection site in monitoring system 10. For example, the memory module may allow for storage and retrieval of a unique fugitive emissions inspection site identifier corresponding to the fugitive emissions inspection site, location data corresponding to the fugitive emissions inspection site, material types corresponding to the fugitive emissions inspection site, diameters corresponding to the fugitive emissions inspection site, flow rates corresponding to the fugitive emissions inspection site, torque values corresponding to the fugitive emissions inspection site, historical emission readings corresponding to the fugitive emissions inspection site, and/or other suitable data corresponding to the fugitive emissions inspection site.

The measuring device may be configured to monitor for fugitive emissions. The measuring device may be configured to collect performance data including a fugitive emissions value. The performance data including the fugitive emissions value may be acquired by portable reader 60 in any manner described above, i.e., manually, automatically, etc. In some embodiments, the measuring device may not be connected to and/or in communication with portable reader 60. The performance data may be manually entered into portable reader 60 in these instances.

A method for monitoring fugitive emissions may be similar to the method already described above. In some embodiments, reader/writer 66 may acquire the one or more performance parameters from a site identifier 20 associated with a selected fugitive emissions inspection site 14. Portable reader 60 may be configured to prompt the user to collect performance data in response to sensor 46 acquiring the one or more performance parameters.

The measuring device may be used to measure and/or collect performance data including a fugitive emissions value. The collected performance data may then be manually entered into portable reader 60, e.g., using keys 64. Portable reader 60 may be configured to provide an alert if performance data has not been entered into portable reader 60 after a predetermined time. Portable reader 60 may be configured to prompt a user to communicate (write) one or more updated performance parameters to site identifier 20. Portable reader 60 may be configured to provide an alert if the one or more updated performance parameters have not been written to site identifier 20 after a predetermined time. The alert may include erasing the collected performance data and/or prompting the user to again collect performance data using the measuring device.

In some embodiments, monitoring system 10 may be used for materials tracking, including for locating pipes, pumps, compressors, valves, flanges, machines, or any other equipment as desired. Monitoring system 10 may comprise any or all components described above, including a site identifier 20 (such as a memory module) associated with one or more materials tracking inspection sites 14. In some embodiments, the memory module may allow for storage and retrieval of data corresponding to the materials tracking inspection site 14. For example, the memory module may allow for storage and retrieval of a unique material tracking inspection site identifier, location data for the materials tracking inspection site 14, historical tracking data corresponding to the materials tracking inspection site 14, and/or suitable data.

While embodiments of a system, apparatus, and methods of use thereof have been particularly shown and described, many variations may be made therein. This disclosure may include one or more independent or interdependent inventions directed to various combinations of features, functions, elements, and/or properties, one or more of which may be defined in the following claims. Other combinations and subcombinations of features, functions, elements, and/or properties may be claimed later in this or a related application. Such variations, whether they are directed to different combinations or directed to the same combinations, whether different, broader, narrower or equal in scope, are also regarded as included within the subject matter of the present disclosure. An appreciation of the availability or significance of claims not presently claimed may not be presently realized. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed.

Where the disclosure recites "a" or "a first" element or the equivalent thereof, such recitations include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Inventions embodied in various combinations and subcombinations of features, functions, elements, and/or properties may be claimed through presentation of claims in a related application. Such claims, whether they are directed to different inventions or directed to the same invention, whether different, broader, narrower or equal in scope to the other claims, are also regarded as included within the subject matter of the present disclosure.

INDUSTRIAL APPLICABILITY

The present disclosure is applicable to devices and methods for industrial monitoring and specifically to monitoring pipeline performance including pipe or wall thickness and fugitive emissions.

We claim:

1. A system for monitoring a pipeline network having plural inspection sites, the system comprising:
   a memory module associated with one or more inspection sites, each memory module storing one or more performance parameters corresponding to the associated inspection site and including site location data of a corresponding inspection site;
   a measuring device operable to collect performance data of each associated inspection site; and
   a portable reader configured to read the memory module, and in association with the measuring device, to compare the one or more performance parameters with the performance data to validate the performance data while in proximity to the associated inspection site, the portable reader further being configured to store site location data corresponding to plural inspection sites, and compare present site location data with reference site location data to determine a location of a destination inspection site.

2. The system of claim 1, wherein the portable reader is further configured to interpret the performance data while in proximity to the associated inspection site.

3. The system of claim 1, wherein the portable reader is further configured to verify the one or more performance parameters while in proximity to the associated inspection site.

4. The system of claim 1, wherein the measuring device and the portable reader form a unitary portable instrument.

5. The system of claim 1, wherein each memory module includes a nonvolatile memory storing the one or more performance parameters.

6. The system of claim 1, wherein the performance data includes current wall thickness, and wherein the one or more performance parameters include nominal wall thickness, minimal wall thickness, and one or more previous wall thicknesses.

7. The system of claim 1, wherein the measuring device is an ultrasound device.

8. The system of claim 1, further wherein the site location data includes global positioning satellite coordinates.

9. The system of claim 1, further wherein the site location data includes a distance value and a direction value.

10. The system of claim 1, further comprising a target associated with one or more inspection sites to define a performance data collection point at such associated inspection site.

11. The system of claim 1, wherein the performance data includes a fugitive emissions value, and the one or more performance parameters include fugitive emissions parameters.

12. A method for monitoring a pipeline network having plural inspection sites, the method comprising the steps of:
storing one or more performance parameters on a memory module associated with such inspection site;
transmitting the one or more performance parameters associated with a present inspection site to a portable reader configured to read the memory module;
comparing with the portable reader one or more performance parameters of the present inspection site with performance data of the present inspection site to validate the performance data while in proximity to the present inspection site; and
associating with one or more inspection sites one or more site location data corresponding to such associated inspection site;
storing site location data corresponding to plural inspection sites on the portable reader; and
comparing present site location data with reference site location data to determine a location of a destination inspection site.

13. A method of claim 12, further comprising the step of collecting the performance data of the present inspection site using a measuring device associated with the portable reader.

14. The method of claim 12, further comprising the step of interpreting with the portable reader the performance data while in proximity to the present inspection site.

15. The method of claim 12, further comprising the step of verifying with the portable reader the one or more performance parameters while in proximity to the present inspection site.

16. The method of claim 12, further comprising the step of transmitting one or more updated performance parameters from the portable reader to the memory module associated with the present inspection site.

17. The method of claim 12, further comprising the step of transmitting one or more updated performance parameters from the portable reader to a remote database.

18. The method of claim 12, further comprising the steps of:
associating with one or more inspection sites a target to define a performance data collection point at such inspection site; and
collecting the performance data at the performance data collection point associated with the present inspection site.

19. The method of claim 12, further comprising the steps of:
storing the one or more site location data on the memory module associated with such inspection site; and
transmitting present site location data of the present inspection site from the memory module to the portable reader.

20. A system for monitoring a pipeline network having plural inspection sites, the system comprising:
a memory module associated with one or more inspection sites, each memory module storing one or more historical performance parameters and present site location data corresponding to such associated inspection site; and
a portable reader configured to read the memory module, wherein the portable reader compares the present site location data with reference site location data stored in the portable reader to determine a relative distance value and a relative direction value of a destination inspection site.

21. The system of claim 20, wherein the site location data includes global positioning satellite coordinates.

22. The system of claim 20, wherein the site location data includes Galileo positioning coordinates.

23. The system of claim 20, wherein the portable reader is configured to adjust the relative distance value and the relative direction value.

* * * * *